(12) United States Patent
Yokokawa

(10) Patent No.: US 7,833,598 B2
(45) Date of Patent: *Nov. 16, 2010

(54) SPLITTABLE SHEET STRUCTURE

(75) Inventor: Kazuyuki Yokokawa, Kawasaki (JP)

(73) Assignee: Avery Dennison Corporation, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/801,187

(22) Filed: Mar. 8, 2001

(65) Prior Publication Data

US 2001/0036525 A1    Nov. 1, 2001

(30) Foreign Application Priority Data

Mar. 9, 2000   (JP) ............................. 2000-071013
May 19, 2000   (JP) ............................. 2000-152774

(51) Int. Cl.
  *B32B 9/00*   (2006.01)
  *B32B 3/28*   (2006.01)
  *B32B 3/00*   (2006.01)
  *B32B 3/10*   (2006.01)
  *B41M 5/20*   (2006.01)
  *B42D 15/00*  (2006.01)
  *G03F 7/00*   (2006.01)
  *G03F 1/00*   (2006.01)
  *G03C 5/18*   (2006.01)

(52) U.S. Cl. .................... 428/40.1; 428/42.1; 428/42.2; 428/42.3; 428/43; 428/167; 428/172; 428/137; 503/227; 283/81; 283/105; 430/253; 430/322; 430/437

(58) Field of Classification Search ................ 428/40.1, 428/43, 42.1, 42.2, 42.3, 167, 172, 137; 503/227, 503/327; 283/81, 105; 430/253, 322, 937, 430/437
See application file for complete search history.

(56) References Cited

U.S. PATENT DOCUMENTS

| 2,434,545 A | 1/1948 | Brady Jr. |
| 3,038,597 A | 6/1962 | Brady, Jr. |

(Continued)

FOREIGN PATENT DOCUMENTS

DE     19519584     12/1996

(Continued)

OTHER PUBLICATIONS

Office Action dated Mar. 10, 2009 from corresponding German Application No. 10127654.0.

(Continued)

*Primary Examiner*—Victor S Chang

(57) ABSTRACT

According to the invention, the resin film to be divided is finely divided along the grooves, whereby the ends of images or characters of photos or the like can be cut off finely. The resin film to be divided is provided with the grooves, thereby finely cutting off the ends of images or characters output on the surface thereof. Further, the resin film is as the lowermost layer, the adhesive layer is provided thereon, and the paper or plastic film with the image receiving layer coat is provided thereon. The grooves formed by cutting the paper or plastic film with image receiving layer coat are previously provided, and the grooves enter a portion of the resin film to be divided, whereby after an image is received, the ends of the film can be finely cut off.

74 Claims, 3 Drawing Sheets

U.S. PATENT DOCUMENTS

| | | | |
|---|---|---|---|
| 3,072,024 A | | 1/1963 | Wengel |
| 3,568,829 A | | 3/1971 | Brady, Jr. |
| 3,896,246 A | | 7/1975 | Brady, Jr. |
| 3,985,927 A | | 10/1976 | Norris et al. |
| 4,048,736 A | | 9/1977 | Castleman et al. |
| 4,128,430 A | | 12/1978 | Newman et al. |
| 4,264,662 A | | 4/1981 | Taylor et al. |
| 4,380,564 A | * | 4/1983 | Cancio ........................ 428/167 |
| 4,428,857 A | | 1/1984 | Taylor |
| 4,465,729 A | * | 8/1984 | Cancio ........................ 428/167 |
| 4,732,069 A | | 3/1988 | Wood et al. |
| 4,863,772 A | | 9/1989 | Cross |
| 4,910,070 A | | 3/1990 | Al'Hariri |
| 5,007,191 A | | 4/1991 | Klein |
| 5,087,405 A | | 2/1992 | Maker |
| 5,198,275 A | | 3/1993 | Klein |
| 5,238,269 A | | 8/1993 | Levine |
| 5,275,868 A | | 1/1994 | Popat et al. |
| 5,284,689 A | | 2/1994 | Laurash et al. |
| 5,296,279 A | * | 3/1994 | Birnbaum et al. .......... 428/42.2 |
| 5,366,250 A | | 11/1994 | Sunabe |
| 5,407,893 A | | 4/1995 | Koshizuka et al. |
| 5,560,966 A | * | 10/1996 | Kishimoto ................... 428/43 |
| 5,571,587 A | | 11/1996 | Bishop et al. |
| 5,665,504 A | | 9/1997 | Malhotra |
| 5,702,789 A | | 12/1997 | Fernandez-Kirchberger |
| 5,853,837 A | * | 12/1998 | Popat ........................... 428/43 |
| 5,914,165 A | | 6/1999 | Freedman |
| 5,936,227 A | | 8/1999 | Truggelmann et al. |
| 5,993,928 A | * | 11/1999 | Popat ........................... 428/43 |
| 5,997,680 A | | 12/1999 | Popat |
| 6,016,618 A | * | 1/2000 | Attia et al. .................... 40/633 |
| 6,039,356 A | | 3/2000 | Warther et al. |
| 6,159,568 A | | 12/2000 | Freedman et al. |
| 6,164,851 A | | 12/2000 | Sakamoto et al. |
| 6,173,649 B1 | * | 1/2001 | Onishi ......................... 101/483 |
| 6,284,708 B1 | * | 9/2001 | Oshima ...................... 503/227 |
| 6,358,587 B1 | | 3/2002 | Saint et al. |
| 6,380,132 B1 | * | 4/2002 | Mihara et al. ............... 503/227 |
| 6,627,286 B1 | | 9/2003 | Lutz |
| 6,827,373 B2 | | 12/2004 | Zumberge |
| 2001/0007703 A1 | | 7/2001 | Weirather et al. |
| 2001/0036525 A1 | | 11/2001 | Yokokawa |
| 2003/0148056 A1 | | 8/2003 | Utz et al. |
| 2003/0232191 A1 | | 12/2003 | Ishikawa |
| 2004/0209029 A1 | | 10/2004 | Utz et al. |
| 2005/0089664 A1 | | 4/2005 | Utz et al. |
| 2005/0095388 A1 | | 5/2005 | Utz et al. |
| 2005/0208254 A1 | | 11/2005 | Yokokawa |

FOREIGN PATENT DOCUMENTS

| | | |
|---|---|---|
| DE | 29805481 | 9/1998 |
| DE | 19813314 | 9/1999 |
| DE | 29907361 | 3/2000 |
| DE | 19945254 | 8/2001 |
| DE | 69909841 | 5/2004 |
| EP | 0894621 | 2/1999 |
| EP | 0987195 | 3/2000 |
| EP | 1274619 | 1/2003 |
| EP | 0987670 | 9/2003 |
| FR | 1586336 | 1/1970 |
| FR | 1.586.336 | 2/1970 |
| FR | 2 797 607 | 2/2001 |
| JP | 05-318672 | 12/1993 |
| JP | 2003301843 A | 10/2002 |
| JP | 200417541 | 1/2004 |
| WO | WO 00/16978 | 3/2000 |
| WO | WO 00/32412 | 6/2000 |
| WO | 00/46316 | 8/2000 |
| WO | WO 00/46316 | 8/2000 |
| WO | WO 01/10701 A2 | 8/2000 |

OTHER PUBLICATIONS

Office Action dated Jul. 18, 2003 from corresponding French Application No. 200108593.
Restriction requirement dated Apr. 3, 2006 from Continuation U.S. Appl. No. 11/134,724.
Response dated Apr. 26, 2006 from Continuation U.S. Appl. No. 11/134,724.
Office action dated Jun. 1, 2006 from Continuation U.S. Appl. No. 11/134,724.
Amendment dated Jun. 22, 2006 from Continuation U.S. Appl. No. 11/134,724.
Office action dated Sep. 14, 2006 from Continuation U.S. Appl. No. 11/134,724.
Amendment dated Jan. 12, 2007 from Continuation U.S. Appl. No. 11/134,724.
Office action dated Apr. 17, 2007 from Continuation U.S. Appl. No. 11/134,724.
Amendment dated Jul. 16, 2007 from Continuation U.S. Appl. No. 11/134,724.
Office action dated Sep. 27, 2007 from Continuation U.S. Appl. No. 11/134,724.
Amendment dated Nov. 8, 2007 from Continuation U.S. Appl. No. 11/134,724.
Amendment dated Nov. 15, 2007 from Continuation U.S. Appl. No. 11/134,724.
Office action dated Feb. 6, 2008 from Continuation U.S. Appl. No. 11/134,724.
Amendment dated Mar. 19, 2008 from Continuation U.S. Appl. No. 11/134,724.
Office action dated May 14, 2008 from Continuation U.S. Appl. No. 11/134,724.
Amendment dated Aug. 14, 2008 from Continuation U.S. Appl. No. 11/134,724.
Notice re noncompliant amendment dated Oct. 20, 2008 from Continuation U.S. Appl. No. 11/134,724.
Letter vacating notice of noncompliance dated Dec. 8, 2008 from Continuation U.S. Appl. No. 11/134,724.
Interview summary record dated Dec. 11, 2008 from Continuation U.S. Appl. No. 11/134,724.
Office action dated Jan. 13, 2009 from Continuation U.S. Appl. No. 11/134,724.
Amendment dated Jul. 13, 2009 from Continuation U.S. Appl. No. 11/134,724.
Office action dated Sep. 2, 2009 from Continuation U.S. Appl. No. 11/134,724.
Amendment dated Dec. 2, 2009 from Continuation U.S. Appl. No. 11/134,724.
Interview Summary dated Jan. 5, 2010 from Continuation U.S. Appl. No. 11/134,724.
Notice of Allowance dated Mar. 8, 2010 from Continuation U.S. Appl. No. 11/134,724.
Office Action dated Oct. 17, 2005 from prior German Application No. 10127654.0.
Response dated Aug. 30, 2006 from prior German Application No. 10127654.0.
Amendment dated Dec. 5, 2007 from prior German Application No. 10127654.0.
Amendment dated Jul. 13, 2009 from prior German Application No. 10127654.0.

* cited by examiner

SPLITTABLE SHEET STRUCTURE

BACKGROUND OF THE INVENTION

Output paper or films on the market at present has disadvantage that in the case of making a visiting card or the like smaller than the original output size, in the case of making multi-print and cutting off the same, or in the case of overall coat printing, generally the prints are cut off by a cutter or scissors, or previously the paper or films are perforated to be separated after printing, which causes the trouble of using tools or a mistake in cutting, or in the case of a perforation, jagged cutoff edges remarkably cause degradation.

SUMMARY OF THE INVENTION

A resin film integrated with a photo or the like is previously provided with slits, and after receiving an image, the resin film is cut off at the slits to produce very fine and beautiful divided parts. It is possible to divide into parts more simply and finely as compared with the case of dividing photos or the like along a perforation in the past. In some method, an adhesive layer is used in the intermediate portion, and in the other method, an intermediate layer is not used.

Embodiment A: An image dividing film, in which a resin film to be divided is previously provided with grooves, whereby images or characters output on the film are finely divided along the grooves.

Embodiment B: An image dividing film, in which a resin film to be divided is as the lowermost layer, an adhesive layer is provided thereon, a paper or plastic film with image receiving layer coat for each printer is provided thereon to form a three-layer structure, and grooves are cut in the paper or the plastic film and the adhesive layer to be divided by a cutter, the grooves entering a portion of the resin film to be divided, whereby a user bends the film along the slits to finely divide output images or characters along the grooves.

Embodiment C: The image dividing film according to Embodiment A or B, wherein the resin film to be divided is a cellulosic film.

Embodiment D: The image dividing film according to Embodiment B, wherein the depth and groove width of a slit to the resin film to be divided are varied depending on the raw material characteristics and thickness of the resin film to be divided.

Embodiment E: The image dividing film according to Embodiment A, wherein dissolved resin is directly applied to a printing paper or film to form a two-layer structure of the printing paper or film and the resin film to be divided without an adhesive layer.

Embodiment F: The image dividing film according to Embodiments A to E, wherein various coats by ink jet laser, sublimation and the like are applied to the resin film to be divided to cope with various uses.

Embodiment G: The image dividing film according to Embodiments A to E, wherein the resin film to be divided is compounded with every raw material including paper or film coated with various image receiving layers by ink jet laser or sublimation and the like to meet various uses.

Embodiment H: An image dividing film for multiple sizes, in which one side surface of a resin film to be divided is subjected to various image receiving layer coat treatment by ink jet laser, sublimation and the like, and the surface thereof opposite to the treated surface is provided with many fine slits as ruled into squares, whereby a user is capable of freely setting dividing positions.

Embodiment I: The image dividing film according to Embodiment H, wherein a paper or plastic film layer made of polyethylene, polypropylene, polyester or the like is laminated on the surface of the resin film to be divided opposite to the image receiving layer coat surface to effect the image dividing film inexpensively, the grooves completely divide and cut the paper and the resin layer, and the grooves enter a portion of the resin film to be divided.

Embodiment J: An image dividing film, in which slits as ruled into squares are provided extending to a little lower part of an adhesive layer, thereby dividing and cutting off along the slits as ruled into squares.

DESCRIPTION OF PREFERRED EMBODIMENTS

Figure 1:
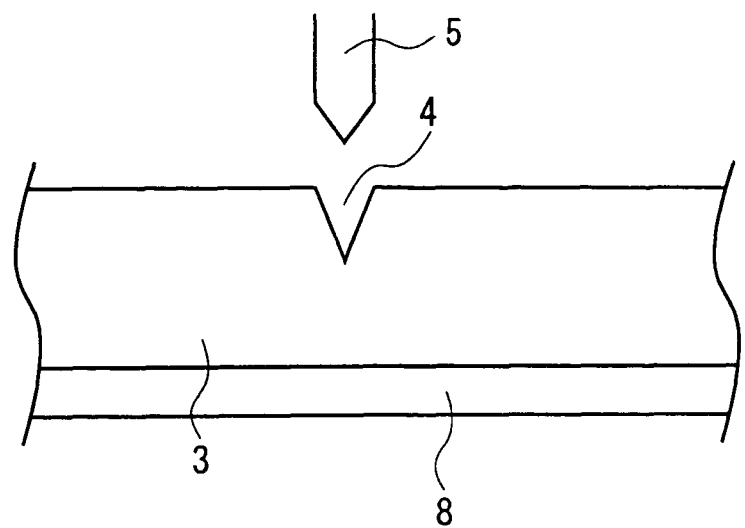
FIG. 1 is a sectional view of an image dividing film according to a first embodiment of the invention.

This invention relates to paper or a film for printing output which may simplify various type of cutting off for various cards such as a visiting card or various sizes of photos and very finely achieve cutting off after prints are output from a digital camera or a photo CD.

In the drawings, the reference numeral 1 designates paper or a plastic film with an image receiving layer coat, 2 an adhesive layer, 3 a resin film to be divided, 4 a slit, 5 a cutter, 6 an image, 7 an edge part, 8 an image receiving layer, and 9 a reinforcement paper or plastic film layer.

Figure 3:
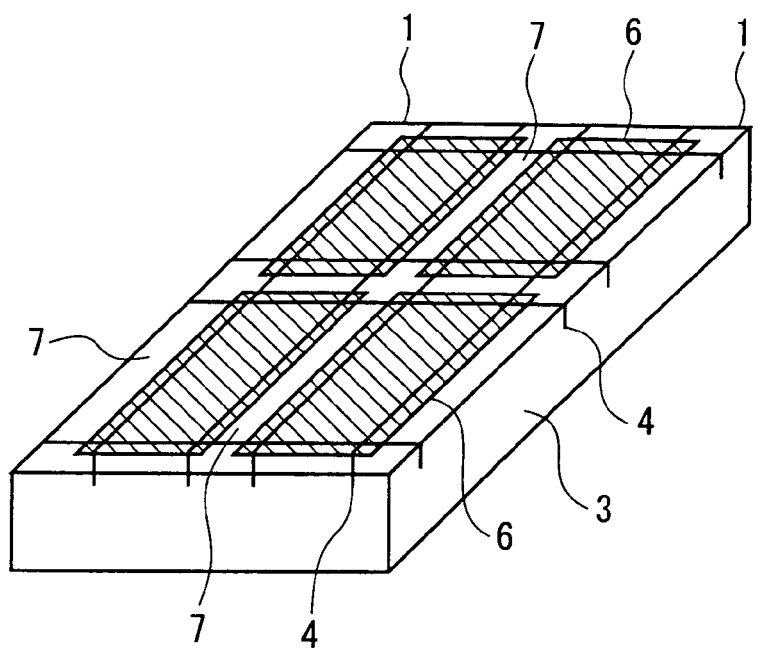
FIG. 3 is a perspective view of the image dividing film according to the first embodiment of the invention.

A first embodiment of the invention is shown in FIGS. 1 and 3.

According to the invention, the resin film 3 to be divided is as a base, an image receiving coat 8 suitable for each printer is applied to one side or both sides thereof, and a slit 4 of each size depending on purpose is previously made in either the surface or the back surface by the cutter 5. A user purchases such slit film, and after purchasing, the user prints images, characters or the like thereon according to a cutoff size, bends the film upward or downward along the slit, and then cuts off by utilizing its property of splitting along the slit of the resin film to be divided.

As the stage of manufacture, a white coat or a mat coat is previously applied as needed to one side or both sides of a resin film to be divided as a base according to purpose, subsequently an image receiving coat 8 suitable for a printer is applied thereto, and a slit 4 is made in one side or both sides according to each intended size.

As shown in FIG. 3, at the time of separating images or characters into four faces, previously four longitudinal and four horizontal slits are made inside the portions corresponding to the image 6 of four faces, and after the image portions are printed out, dividing can be finely achieved along the slits.

Figure 2:
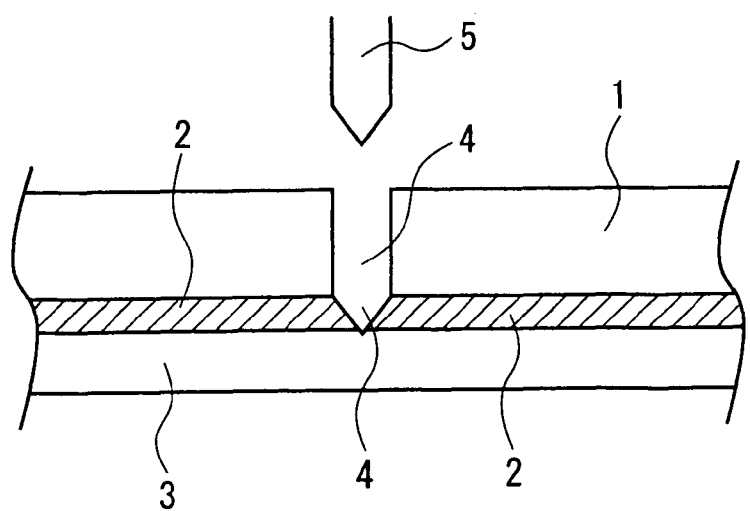
FIG. 2 is a sectional view of an image dividing film according to a second embodiment of the invention.
Figure 4:
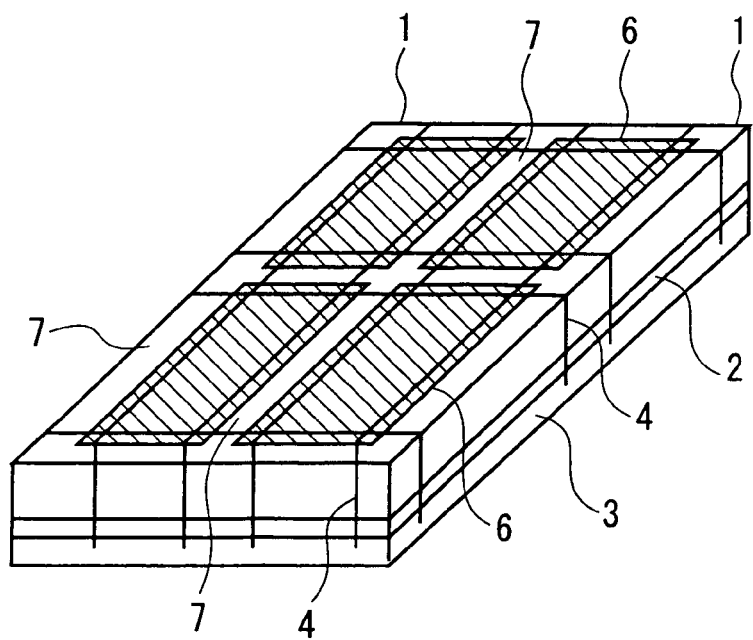
FIG. 4 is a perspective view of the image dividing film according to the second embodiment of the invention.

A second embodiment will now be described with reference to FIGS. 2 and 4.

An adhesive layer 2 is provided on the lower side of paper or a plastic film 1 with image receiving layer coat, and a resin film 3 to be divided is provided under the adhesive layer 2 to form a three-layer structure. As shown in FIG. 4, in the case of cutting away image portions of four faces, previously four longitudinal slits 4 and four horizontal slits 4 are made by a cutter.

The slits 4 completely divide the paper or plastic film 1 with image receiving layer coat and further partially divide an upper part of the lowermost resin film 3 to be divided.

The depth, groove width and shape of each slit vary depending on the thickness of the resin film to be divided.

When a user performs printing-out according to the image portions of the paper or plastic film 1 with image receiving layer coat and bends the print several times as in the perforation heretofore in use, the resin film to be divided can be well divided at the slits in its property to accomplish fine separation.

In the drawings, the reference numeral 7 designates the useless edge parts to be thrown away.

A third embodiment will now be described.

Figure 5:
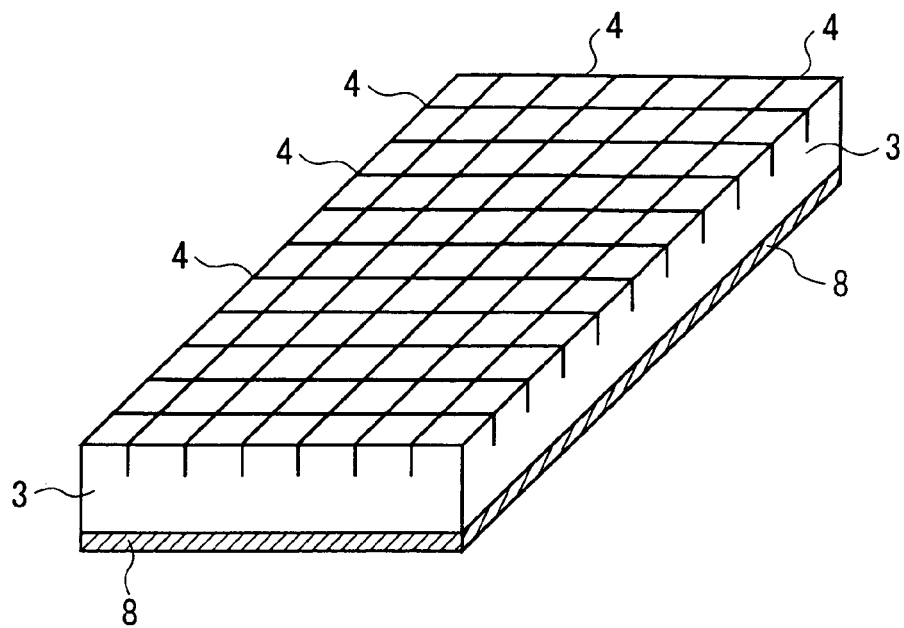
FIG. 5 is a perspective view of an image dividing film according to a third embodiment of the invention.

As shown in FIG. 5, the surface of a resin film to be divided opposite to the surface thereof applied with the image receiving layer coat 8 is provided with many fine slits as ruled into squares.

A user prints out characters or images on the image receiving layer coat 8 surface in a desired assembling manner with desired dimension, and the slit portion nearest a position desired to be cut off by the user is bent upward and downward as in the perforation heretofore in use to finely accomplish dividing.

A fourth embodiment will now be described.

Figure 6:
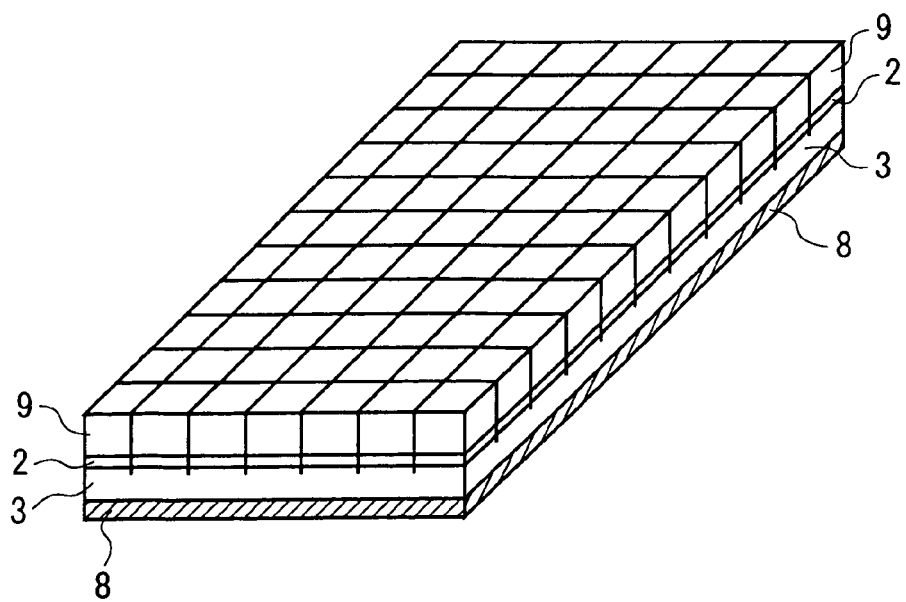
FIG. 6 is a perspective view of an image dividing film according to a fourth embodiment of the invention.

As shown in FIG. 6, the surface of a resin film to be divided opposite to the surface thereof applied with an image receiving layer coat 8 is laminated with paper, or a plastic film 9 for reduction of cost and reinforcement.

Further, similarly to the second embodiment, an adhesive layer is provided in the intermediate part.

The surface laminated with paper or a plastic film and the adhesive layer 2 are completely divided, and similarly to the third embodiment, many fine slits 4 as ruled into squares are made in a portion of the resin film to be divided.

Similarly to the third embodiment, a user prints out images or characters on the image receiving layer coat 8 surface an a free assembling manner with desired dimension, and the slit portion nearest a position desired to be cut off by the user is bent upward and downward as in the perforation heretofore in use to finely accomplish dividing.

INDUSTRIAL APPLICABILITY

Although in a conventional method of dividing at the perforation, a cut end is bad, in the methods described above, dividing can be accomplished beautifully and finely, so the invention is of very high utility value.

That is, when dividing is performed according to these four methods, the photos can be divided finely in the property of the resin film to be divided, so that the value of merchandise is very heightened.

What is claimed is:

1. A sheet structure comprising:
   a print receptive first layer;
   a second layer attached to a planar surface of the first layer;
   the first layer and the second layer at least substantially forming a multi-layered sheet;
   first, second, third, and fourth continuous cut lines cut completely through the first layer but not entirely through a thickness of the multi-layered sheet;
   the first and second cut lines being parallel to each other;
   the third and fourth cut lines being parallel to each other and perpendicular to the first and second cut lines and intersecting them;
   the multi-layered sheet and the first cut line being constructed and adapted to cause the sheet structure or a portion thereof to split i) on at least a portion of the first cut line and ii) through the entire sheet structure, when the sheet structure or a portion thereof is bent on the first cut line upwardly only once or downwardly only once;
   the multi-layered sheet and the second cut line being constructed and adapted to cause the sheet structure or a portion thereof to split i) on at least a portion of the second cut line, and ii) through the entire sheet structure, when the sheet structure or a portion thereof is bent on the second cut line upwardly only once or downwardly only once;
   the multi-layered sheet and the third cut line being constructed and adapted to cause the sheet structure or a portion thereof to split i) on at least a portion of the third cut line, and ii) through the entire sheet structure, when the sheet structure or a portion thereof is bent on the third cut line upwardly only once or downwardly only once;
   the multi-layered sheet and the fourth cut line being constructed and adapted to cause the sheet structure or a portion thereof to split i) on at least a portion of the fourth cut line, ii) through the entire sheet structure, and iii) into separate sheet portions that are configured to be separated apart from one another, when the sheet structure or a portion thereof is bent on the fourth cut line upwardly only once or downwardly only once;
   the sheet structure having a lower bottom-most surface, and respective portions of the lower bottom-most surface forming lower bottom-most surfaces of the separate sheet portions; and
   the sheet structure having a top upper-most surface, and respective portions of the top upper-most surface forming top upper-most surfaces of the separate sheet portions.

2. The sheet structure of claim 1, wherein at least one of images or characters are printable on at least one of the first layer or the second layer by passing the sheet structure through a printer.

3. The sheet structure of claim 1, wherein the cut lines are configured by their depth, groove width and shape to provide the split.

4. The sheet structure of claim 1, wherein the multilayered sheet includes a paper layer.

5. The sheet structure of claim 1, wherein the first layer or the second layer is a cellulosic layer.

6. The sheet structure of claim 1, wherein the sheet structure is photoreceptive.

7. The sheet structure of claim 1, wherein the first layer is a printing paper or film, and the second layer includes dissolved resin directly applied to the printing paper or film to form the multi-layered sheet.

8. The sheet structure of claim 1, wherein a surface of the multilayered sheet is adapted to receive a printed image or character.

9. The sheet structure of claim 1, wherein the cut lines are die cut lines.

10. The sheet structure of claim 1, wherein the second layer is a resin film.

11. The sheet structure of claim 1, wherein the separate sheet portions includes a portion of the first layer and a portion of the second layer secured to the portion of the first layer.

12. The sheet structure of claim 1, wherein the first and second cut lines both engage opposing edges of the multi-layered sheet.

13. The sheet structure of claim 12, wherein the third and fourth cut lines both engage opposing edges of the multi-layered sheet.

14. The sheet structure of claim 1, further comprising a fifth cut line parallel to either the first or third cut line and cut completely through the first layer but not entirely through a thickness of the multi-layered sheet.

15. A sheet structure comprising:
a print receptive first layer;
a second layer attached to a planar surface of the first layer;
the first layer and the second layer at least substantially forming a multi-layered sheet having perimeter edges;
a plurality of continuous cut lines cut completely through the first layer but not entirely through the thickness of the multi-layered sheet, the plurality of cut lines including a plurality of horizontal cut lines and a plurality of vertical cut lines in a grid therewith, and the plurality of cut lines defining a plurality of sheet portions en-in the multi-layered sheet;
at least one of the first and second layers being selected and constructed, and the cut lines being configured, such that the sheet structure can be bent upwardly only once, or downwardly only once, along at least some of the plurality of cut lines, to thereby be split i) along the at least some of the plurality of cut lines, and ii) through the entire sheet structure, to separate the sheet portions of the sheet structure into a plurality of individual sheet portions that are configured to be separated apart from one another;
each edge of each of the individual sheet portions is formed by one of the split cut lines or one of perimeter edges; and
each of the individual sheet portions including a portion of the first layer and a portion of the second layer secured to the portion of the first layer.

16. The sheet structure of claim 15, wherein at least one of images or characters are printable on at least one of the first layer or the second layer by passing the sheet structure through a printer.

17. The sheet structure of claim 15, wherein the cut lines are configured by their depth, groove width and shape to provide the split.

18. The sheet structure of claim 15, wherein the multilayered sheet includes a paper layer.

19. The sheet structure of claim 15, wherein each of the plurality of sheet portions has a size determined by a user selecting the plurality of cut lines to be split, so that when separated from the sheet structure, the plurality of sheet portions form individual sheet portions of desired sizes.

20. The sheet structure of claim 19, wherein the sheet structure is photoreceptive.

21. The sheet structure of claim 15, wherein the first layer or the second layer is a cellulosic layer.

22. The sheet structure of claim 15, wherein the first layer is a printing paper or film, and the second layer includes dissolved resin directly applied to the printing paper or film to form the multi-layered sheet.

23. The sheet structure of claim 15, wherein a surface of the multilayered sheet is adapted to receive a printed image or character.

24. The sheet structure of claim 15, wherein the cut lines are die cut lines.

25. The sheet structure of claim 15, wherein the cut lines include horizontal and vertical cut lines forming a matrix on the first layer.

26. The sheet structure of claim 15, wherein the second layer is a resin film.

27. The sheet structure of claim 15, wherein the sheet structure has a lower bottom-most surface, and respective portions of the lower bottommost surface form lower bottom-most surfaces of each of the individual sheet portions.

28. The sheet structure of claim 27, wherein the sheet structure has a top upper-most surface, and respective portions of the top upper-most surface form top upper-most surfaces of each of the individual sheet portions.

29. The sheet structure of claim 15, wherein the plurality of continuous cut lines includes parallel first and second cut lines and parallel third and fourth cut lines positioned perpendicular to the first and second cut lines.

30. The sheet structure of claim 29, wherein the first and second cut lines both engage opposing edges of the multi-layered sheet.

31. The sheet structure of claim 30, wherein the third and fourth cut lines both engage opposing edges of the multi-layered sheet.

32. The sheet structure of claim 29, wherein the plurality of continuous cut lines includes a fifth cut line parallel to the first and second cut lines.

33. The sheet structure of claim 32, wherein the entire perimeters of each of the individual sheet portions are formed by the cut lines.

34. The sheet structure of claim 32, wherein the sheet structure is photoreceptive.

35. A sheet structure comprising:
a print receptive first layer;
a second layer attached to a planar surface of the first layer;
the first layer and the second layer at least substantially forming a multi-layered sheet;
first, second, third, and fourth continuous cut lines cut completely through the first layer but not entirely through a thickness of the multi-layered sheet;
the first and second cut lines being parallel to each other;
the third and fourth cut lines being parallel to each other and perpendicular to the first and second cut lines and intersecting them;
the multi-layered sheet and the first cut line being structurally capable of causing the sheet structure or a portion thereof to split i) on at least a portion of the first cut line, and ii) through the entire sheet structure, when the sheet structure or a portion thereof is bent on the first cut line upwardly only once or downwardly only once;
the multi-layered sheet and the second cut line being structurally capable of causing the sheet structure or a portion thereof to split i) on at least a portion of the second cut line, and ii) through the entire sheet structure, when the sheet structure or a portion thereof is bent on the second cut line upwardly only once or downwardly only once;
the multi-layered sheet and the third cut line being structurally capable of causing the sheet structure or a portion thereof to split i) on at least a portion of the third cut line, and ii) through the entire sheet structure, when the sheet structure or a portion thereof is bent on the third cut line upwardly only once or downwardly only once;
the multi-layered sheet and the fourth cut line being structurally capable of causing the sheet structure or a portion thereof to split i) on at least a portion of the fourth cut line, ii) through the entire sheet structure, and iii) into separate sheet portions that are configured to be separated apart from one another when the sheet structure or a portion thereof is bent on the fourth cut line upwardly only once or downwardly only once; and the separate sheet portions including a portion of the first layer and a portion of the second layer secured to the portion of the first layer.

36. The sheet structure of claim 35, wherein at least one of images or characters are printable on at least one of the first layer or the second layer by passing the sheet structure through a printer.

37. The sheet structure of claim 35, wherein the cut lines are configured by their depth, groove width and shape to provide the split.

38. The sheet structure of claim 35, wherein the multilayered sheet includes a paper layer.

39. The sheet structure of claim 35, wherein the first layer or the second layer is a cellulosic layer.

40. The sheet structure of claim 35, wherein a perimeter edge of the sheet structure forms a portion of a perimeter of at least one of the sheet portions.

41. The sheet structure of claim 35, wherein the sheet structure is a photo-receptive sheet structure.

42. The sheet structure of claim 35, wherein the first layer is a printing paper or film, and the second layer includes dissolved resin directly applied to the printing paper or film to form the multi-layered sheet.

43. The sheet structure of claim 35, wherein a surface of the multilayered sheet is adapted to receive a printed image or character.

44. The sheet structure of claim 35, wherein the cut lines are die cut lines.

45. The sheet structure of claim 35, wherein the second layer is a resin film.

46. The sheet structure of claim 35, wherein the sheet structure has a lower bottom-most surface, and respective portions of the lower bottommost surface form lower bottommost surfaces of the separate sheet portions.

47. The sheet structure of claim 46, wherein the sheet structure has a top upper-most surface, and respective portions of the top upper-most surface form top upper-most surfaces of the separate sheet portions.

48. The sheet structure of claim 35, wherein the first and second cut lines both engage opposing edges of the multi-layered sheet.

49. The sheet structure of claim 48, wherein the third and fourth cut lines both engage opposing edges of the multi-layered sheet.

50. The sheet structure of claim 35, further comprising a fifth cut line parallel to either the first or third cut line and cut completely through the first layer but not entirely through a thickness of the multi-layered sheet.

51. A sheet structure comprising:
a print receptive first layer;
a second layer attached to a planar surface of the first layer;
the first layer and the second layer at least substantially forming a multi-layered sheet having perimeter edges;
a plurality of continuous cut lines cut completely through the first layer but not entirely through the thickness of the multi-layered sheet, the plurality of cut lines including a plurality of horizontal cut lines and a plurality of vertical cut lines in a grid therewith, and the plurality of cut lines defining a plurality of sheet portions in the multi-layered sheet;
at least one of the first and second layers and the cut lines being structurally capable of causing the sheet structure when bent upwardly only once, or downwardly only once, along at least some of the plurality of cut lines, to thereby be split i) along the at least some of the plurality of cut lines, and ii) through the entire sheet structure, to separate the sheet portions of the sheet structure into a plurality of individual sheet portions that are configured to be separated apart from one another;
each edge of each of the individual sheet portions is formed by one of the split cut lines or one of the perimeter edges; and each of the individual sheet portions including a portion of the first layer and a portion of the second layer secured to the portion of the first layer.

52. The sheet structure of claim 51, wherein at least one of images or characters is printable on at least one of the first layer or the second layer by passing the sheet structure through a printer.

53. The sheet structure of claim 51, wherein the cut lines are configured by their depth, groove width and shape to provide the split.

54. The sheet structure of claim 51, wherein the multilayered sheet includes a paper layer.

55. The sheet structure of claim 51, wherein each of the plurality of individual sheet portions has a size determined by a user selecting the plurality of cut lines to be split, so that when separated from the sheet structure, the plurality of individual sheet portions form individual sheet portions of desired sizes.

56. The sheet structure of claim 55, wherein the sheet structure is a photo-receptive sheet structure.

57. The sheet structure of claim 51, wherein the first layer or the second layer is a cellulosic layer.

58. The sheet structure of claim 51, wherein the first layer is a printing paper or film, and the second layer includes dissolved resin directly applied to the printing paper or film to form the multi-layered sheet.

59. The sheet structure of claim 51, wherein a surface of the multilayered sheet is adapted to receive a printed image or character.

60. The sheet structure of claim 51, wherein the cut lines are die cut lines.

61. The sheet structure of claim 51, wherein the cut lines include horizontal and vertical cut lines forming a matrix in the first layer.

62. The sheet structure of claim 51, wherein the second layer is a resin film.

63. The sheet structure of claim 51, wherein the sheet structure has a lower bottom-most surface, and respective portions of the lower bottommost surface form lower bottommost surfaces of each of the individual sheet portions.

64. The sheet structure of claim 63, wherein the sheet structure has a top upper-most surface, and respective portions of the top upper-most surface form top upper-most surfaces of each of the individual sheet portions.

65. The sheet structure of claim 51, wherein the plurality of continuous cut lines includes parallel first and second cut lines and parallel third and fourth cut lines perpendicular to the first and second cut lines.

66. The sheet structure of claim 65, wherein the first and second cut lines both engage opposing edges of the multi-layered sheet.

67. The sheet structure of claim 66, wherein the third and fourth cut lines both engage opposing edges of the multi-layered sheet.

68. The sheet structure of claim 65, wherein the plurality of continuous cut lines includes a fifth cut line parallel to the first and second cut lines.

69. The sheet structure of claim 51, wherein the entire perimeters of each of the individual sheet portions are formed by the split cut lines.

70. The sheet structure of claim 51, wherein the sheet structure is a photo-receptive sheet structure.

71. The sheet structure of claim 15, wherein the portion of the first layer and the portion of the second layer are coextensive with one another.

72. The sheet structure of claim 35, wherein the portion of the first layer and the portion of the second layer are coextensive with one another.

73. The sheet structure of claim 51, wherein the portion of the first layer and the portion of the second layer are coextensive with one another.

74. The sheet structure of claim 1, wherein the cut lines are die cut lines, the second layer is a resin film, and a surface of the multi-layered sheet is adapted to receive a printed image or character.

* * * * *